United States Patent [19]

Kawakami et al.

[11] Patent Number: 4,810,566
[45] Date of Patent: Mar. 7, 1989

[54] HIGHLY CRYSTALLIZED MOLDED POLYARYLENE THIOETHER AND PROCESS FOR PRODUCING IT

[75] Inventors: Yukichika Kawakami; Takao Iwasaki; Zenya Shiiki, all of Iwaki, Japan

[73] Assignee: Kureha Kagaku Kogyo Kabushiki Kaisha, Tokyo, Japan

[21] Appl. No.: 175,357

[22] Filed: Mar. 30, 1988

[30] Foreign Application Priority Data

Mar. 30, 1987 [JP] Japan .................. 62-77022

[51] Int. Cl.$^4$ ............. C08G 75/14; B29C 71/02; D02J 1/22
[52] U.S. Cl. ................. 428/220; 264/235.6; 264/235.8; 264/289.6; 528/388
[58] Field of Search ......... 264/289.6, 235.6, 235.8, 264/210.5, 331.11; 528/388; 428/220

[56] References Cited

U.S. PATENT DOCUMENTS 4,286,018 8/1981 Asakura et al.
4,629,778 12/1986 Sugie et al. ................ 264/331.11
4,645,825 2/1987 Idel et al. .................... 264/210.7

FOREIGN PATENT DOCUMENTS 56-034426 4/1981 Japan .
57-121052 7/1982 Japan .
59-184619 10/1984 Japan .
62-242517 10/1987 Japan .

Primary Examiner—James Lowe
Attorney, Agent, or Firm—Oblon, Fisher, Spivak, McClelland & Maier

[57] ABSTRACT

A highly crystallized, molded product of a polyarylene thioether resin, which has little dimensional deformation and wavy wrinkles, is high in heat-resistance and transparency and is tough and is obtained by the process comprising the steps of stretching a molded product mainly consisting of polyarylene thioether of the crystallization degree of not more than 15% in at least one direction at a stretching ratio of 2 to 5 times, making an organic solvent having a solubility parameter of 8 to 12, contacting the solvent with the stretched, molded product at a temperature in the range of from the solidifying point of the solvent to 130° C., thereby preliminarily crystallizing the stretched, molded product until the increased portion of the crystallization degree becomes not less than 6% and then thermally treating preliminarily crystallized product at 140° to 300° C. until the crystallization degree reaches not less than 22%.

5 Claims, No Drawings

HIGHLY CRYSTALLIZED MOLDED POLYARYLENE THIOETHER AND PROCESS FOR PRODUCING IT

BACKGROUND OF THE INVENTION

The present invention relates to a crystallized, molded product of a polyarylene thioether (hereinafter referred to as PATE) resin.

More in detail, the present invention relates to a highly crystallized, molded product of PATE resin, which is obtained by the process comprising the steps of (1) stretching a melt-molded product of PATE, (2) preliminarily crystallizing the stretched product by treating with an organic solvent and (3) highly crystallizing the treated product by thermal treatment.

Further, the present invention relates to a highly crystallized and tough molded product of PATE resin, which is small in dimensional deformation and wavy wrinkles on the surface, and is high in heat-resistance, bending-resistance and transparency.

As PATE resin, such as polyparaphenylene thioether resin, etc., is one of the engineering resins excellent in heat resistance, moisture resistance, chemical resistance, flame retardance and mechanical properties and these properties can be given to the resin only when it is crystallized sufficiently, it is extremely important to increase the crystallization degree of molded products of PATE.

However, when an amorphous molded product of PATE resin is thermally treated to crystallize sufficiently without applying a large stress (tension, compression, etc.), coarse spherulites usually develope in the molded product and it becomes brittle or opaque and at the same time, uneven relaxation and contraction occur on the product, thereby causing a dimensional deformation and wavy wrinkles. Accordingly, there has been a severe problem that the original shape of the molded product cannot be maintained through the thermal treatment.

Consequently, it was extremely difficult to treat a melt-molded product thermally, with no stress applied, without causing embrittlement, dimensional deformation and wavy wrinkles and maintaining the original shape and transparency. For extrusion molded products such as sheets, plates, pipes, profiles and blow bottles, for which it is difficult to apply stress, it was especially difficult to treat the product thermally.

Thereupon, the present inventors once developed a method of treating the molded product of PATE with an organic solvent, which has an affinity to PATE, to crystallize it highly with no applied stress, without having wavy wrinkles (Japanese Patent Application No. 61-12,889 (1986)). However, there was a problem in achieving the high crystallization by this method since the treatment takes a relatively long time.

Then, the present inventors developed a method of obtaining a highly crystallized, molded product within a short time having substantially no dimensional deformation nor wavy wrinkles by combining the already described method (Japanese Patent Application No. 61-12,889 (1986)) with a thermal treatment. Namely, the molded product is preliminarily crystallized by a solvent and then the preliminarily crystallized product is treated thermally (Japanese Patent Application No. 61-296,454 (1986)). However, it has been recognized that the method sometimes makes the product brittle and opaque.

The present inventors have further extensively studied methods to highly crystallize a melt-molded product by thermal treatment with no or substantially no stress without making the product brittle or opaque and without any accompanying dimensional deformation and wavy wrinkles, and finally, they have found the following unexpected results.

When a method which comprises steps of preliminarily crystallizing a melt-molded product at a low temperature with an organic solvent having a sufficient affinity to PATE resin and of thermally treating the crystallized product (already described in Japanese Patent Application No. 61-296,454 (1986)), is combined with a stretching step, namely, when a melt-molded product is stretched at least in one direction, preliminarily crystallized by an organic solvent, and then highly crystallized by thermal treatment, a highly crystallized molded product can be obtained in a short cycle without becoming brittle or opaque and without accompanying dimensional deformation and wavy wrinkles, therefore maintaining original shape and transparency. Furthermore, since the elongation of the highly crystallized molded product at high temperature is large, another effect has also been found, i.e., that the molded product can be easily remolded by compression molding or stretching at high temperature.

The present invention has been attained based on these findings.

SUMMARY OF THE INVENTION

The object of the present invention is to provide a highly crystallized and tough molded product of PATE resin, which is small in dimensional deformation and wavy wrinkles on the surface and is high in heat-resistance, bending-resistance and transparency.

Further, the object of the present invention is to provide a highly crystallized, molded product of PATE obtained by the process comprising the steps of (1) stretching a molded product consisting of a resin mainly comprising PATE containing a repeating unit of

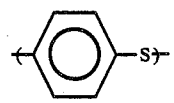

not less than 70% and having a crystallization degree (hereinafter, means the value measured by a density method) of not more than 15% into at least one direction 2 to 5 times, (2) bringing the stretched product into contact with at least one organic solvent having a solubility parameter (SP value) of 8 to 12 or a mixed solvent containing not less than 50 wt. % of the organic solvent, at a temperature from the solidifying point of the solvent used to 130° C., thereby preliminarily crystallizing the treated, molded product until an increase of the crystallization degree of PATE in the molded product becomes not less than 6% and then (3) subjecting the preliminarily crystallized, molded product to thermal treatment at a temperature of 140° to 300° C. until the crystallization degree of PATE in the molded product becomes not less than 22%.

DETAILED DESCRIPTION OF THE INVENTION

The highly crystallized, molded product of PATE according to the present invention is characterized in that it has been obtained by the process comprising the steps of (1) stretching a molded product consisting of a resin mainly comprising PATE containing a repeating unit of

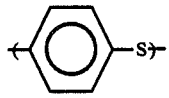

not less than 70 mol % and having a crystallization degree of not more than 15% into at least one direction 2 to 5 times, (2) bringing the stretched product into contact with at least one organic solvent having a solubility parameter, SP value, of 8 to 12 or a mixed solvent containing not less than 50 wt. % of the organic solvent, at a temperature from the solidifying point of the solvent used to 130° C., thereby preliminarily crystallizing the treated, molded product until an increase of the crystallization degree of PATE in the molded product becomes not less than 6% and then (3) subjecting the preliminarily crystallized, molded product to thermal treatment at a temperature of 140° to 300° C. until the crystallization degree of PATE in the molded product becomes not less than 22%.

According to the present invention, the thermal treatment of a melt-molded product without making the product brittle and opaque and also without accompanying large deformation has become possible even with no stress, which was quite difficult by prior methods.

By this technique, the highly crystallized, molded product of PATE which is excellent in heat-resistance, toughness and transparency (when no filler is contained), especially an extrusion-molded product or a blow-molded product such as a sheet, plate, pipe, profile or blow bottle, becomes possible to obtain in a short cycle which was quite difficult so far.

Furthermore, in particular, the re-molding by compression molding (for instance, stamping molding, matched-die molding, vacuum molding, etc.) or stretching of said highly crystallized molded product of PATE resin has become quite easy.

The highly crystallized, molded product of PATE obtained by the present invention has the extremely favorable smooth surfaces even when it is thermally treated with no stress. The fact that such a smoothness can be obtained by heating even with no stress cannot be expected and is quite surprising.

Furthermore, the highly crystallized, molded product of PATE of the present invention has the features that, when it is processed into a sheet 0.1 mm in thickness (1) dimensional deformation by thermal treatment is not more than 10%, (2) the number of bending-resistance (bending direction perpendicular to stretching direction) is not less than 1,000 and (3) in the case of not containing any fillers, the degree of transmission to parallel rays, Tp is not less than 20%.

Still more, the highly crystallized, molded product of PATE according to the present invention is quite good in heat-resistance, for example, the heat-resistance to soldering (for 30 seconds at 250° C.) is excellent.

BASIC RESIN

The basic resin which is the subject of the present invention comprises a PATE.

PATE

As a PATE used in the present invention, homopolymer of paraphenylene thioether containing not less than 70 mol % of the paraphenylene thioether unit,

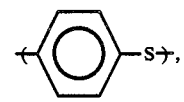

as the main constituent of the polymer and copolymer of phenylene thioether can be mentioned.

As the copolymer, a block copolymer is particularly favorable from the viewpoint of heat-resistance and processability. As a comonomer unit other than paraphenylene thioether, metaphenylene thioether unit,

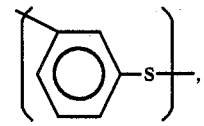

diphenylketone thioether unit,

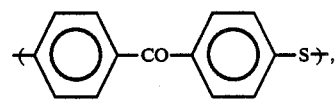

diphenylether thioether unit,

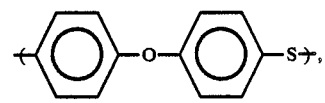

diphenyl sulfone thioether unit,

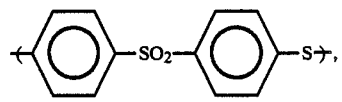

biphenyl thioether unit,

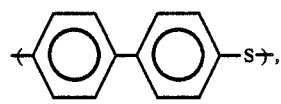

2,6-napthalene thioether unit,

a trifunctional unit,

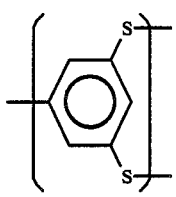

can be exemplified. However, not more than 1 mol % of the trifunctional unit is preferable.

As the PATE, those synthesized according to a known process can be used. Among these known processes, there is a process disclosed in U.S. Pat. No. 3,354,129. This process is to bring p-dichlorobenzene into reaction with sodium sulfide in N-methylpyrrolidone (NMP) to form a polyphenylene thioether.

Another preferable process to product a PATE of high molecular weight is disclosed in U.S. Pat. No. 3,919,177. The process is to perform a reaction between p-dichlorobenzene and sodium sulfide in NMP as a solvent and in the presence of an alkali metal salt of organic acid, such as lithium acetate and sodium acetate. Other processes to obtain a PATE of high molecular weight are disclosed in U.S. Pat. Nos. 4,537,953 and 4,645,826. The processes are, for instance, to perform polymerization reaction in NMP in the presence of inorganic salts, such as lithium carbonate or calcium hydroxide, or under the controls of temperature and a H$_2$O amount in the polymerization reaction.

Further, the polymer, which is obtained by heating a powdery PATE polymer to a temperature lower than its melting point in the presence of oxygen (preferably air) and thereby has somewhat higher melt viscosity can also be used.

As a block copolymer of phenylene thioether, the block copolymer of paraphenylene thioether and metaphenylene thioether is preferred.

The block copolymer comprises the blocks of repeating unit of

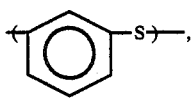

and the blocks of repeating unit of

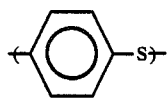

and as far as the formation of each block and the coupling of both blocks are possible, it can be produced by any conventional method. For instance, the method shown in Japanese Patent Application Laid-Open (KOKAI) No. 61-13,228 (1986) may be used. As a concrete method to produce the block copolymer, a method to first form a block of one comonomer and then, at the end of the block, to combine the other comonomer one by one achieving a formation of the other block and a combination of the other block to the first block siuultaneously, can be exemplified. Accordingly, a process to produce the block copolymer of the present invention is substantially not different from conventional processes to produce phenylene thioether polymer, except in cases of (1) giving some consideration to formation and combination of the blocks and to selection of a repeating unit of phenylene sulfide as a comonomer to be used and (2) modifying the process when necessary. Namely, the manufacturing process of the block copolymer consists mainly of a condensation (de-alkali metal halide) polymerization step with alkali metal sulfide and dihalo aromatic compound (mainly p- and m-dihalobenzene) in a non-protonic, polar organic solvent (for example, NMP) by heating.

Further, it is preferable that the melt-viscosity of the block copolymer is in the range of 50 to 20,000 poises measured at the temperature of 310° C. and the shearing rate of 200 second$^{-1}$.

PATE preferably used in the present invention is as mentioned before, a copolymer of phenylene thioether, which contains a phenylene group, preferably a p-phenylene group,

as the main constituent.

As long as the PATE has the repeating units as the main constituent, the PATE can contain a small amount of a branched linkage or crosslinked linkage represented by the formula,

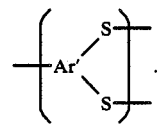

As a comonomer for the above copolymer, the following arylene groups can be exemplified:

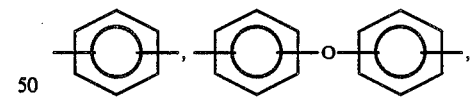

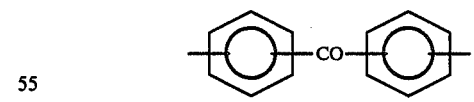

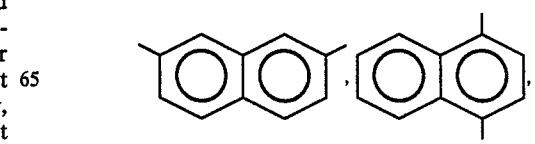

-continued

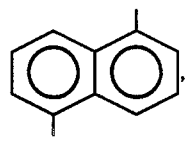

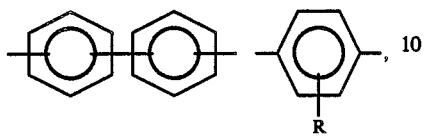

wherein R represents an alkyl group or an alkoxy group, particularly containing one to four carbon atoms, and as Ar',

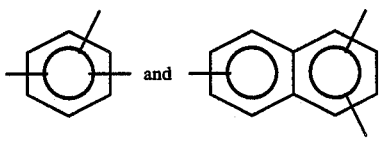

can be mentioned.

As phenylene group, p-phenylene group,

is preferable.

RESIN HAVING A PATE AS THE MAIN COMPONENT

The resin which constitutes the molded products which are the object of the present invention is the resin having PATE as the main component. The words "having PATE as the main component" as used herein means that the resin contains PATE in a predominant amount, namely, not less than 50 wt. %, preferably not less than 80 wt. %. The resin which possesses the specific character of the present invention is the resin consisting substantially of 100 wt. % of PATE at the maximum.

Accordingly, it is favorable to use PATE by itself, however, one or more additives such as an inorganic filler, fibrous filler, other synthetic resin, crystallize-nucleus, crystallization-controlling agent, pigment, stabilizer, lubricant, release agent or anti-rust agent, which does not react with or is not compatible with organic solvents (will be described later), can be used with PATE, so long as it does not give any bad effect to the fabrication.

PRODUCTION OF HIGHLY CRYSTALLIZED, MOLDED PRODUCT

The method for producing the highly crystallized, molded product according to the present invention comprises the steps of (1) melt-molding the appropriate resin, for the present invention, having PATE as the main component (hereinafter referred to as PATE resin) and obtaining a molded product, (2) stretching the said molded product, (3) then treating the stretched product with an organic solvent which has a sufficient affinity to PATE and preliminarily crystallizing the treated product and further, (4) thermally treating the preliminarily crystallized product and highly crystallizing the same.

(1) Step of molding the PATE resin

The PATE resin adequate for the present invention is melted at a temperature higher than its melting point but not higher than 400° C., the melted resin is molded and then the molded product is cooled to its secondary transition temperature to obtain an amorphous or poorly crystallized, molded product. As a concrete method of molding, a conventional melt-molding method such as extrusion molding, compression molding, injection molding, melt-spinning, blow molding, inflation molding can be adopted, however, extrusion molding is especially suitable for the application of the present invention.

It is desirable that the melt-molded product of PATE resin, which will be stretched in the next step and preliminarily crystallized by a treatment with a solvent in the following step, is an amorphous or poorly crystallized product having a crystallization degree of not more than 15%, preferably not more than 10% and more preferably not more than 8%. When the crystallization degree exceeds 15%, it becomes difficult to promote the subsequent preliminary crystallization by an organic solvent.

Although the present invention can be applied to any form of the amorphous, molded products in principle, it is preferable that the thickness of the molded product is in the range of 0.01 to 5 mm, more preferably in the range of 0.015 to 3 mm.

A product with uniform thickness is preferable in order to perform stretching and solvent treating uniformly, for instance, sheets, plates, pipes, filaments and bottles.

(2) Stretching step

The stretching step is an indispensable step for preventing the resin from becoming opaque in the preliminary crystallization step and in the high crystallization step. At the same time, this step is an important step for giving the molded product a high anti-flexural strength and toughness.

It is appropriate to carry out the stretching in, at least, one direction 2 to 5 times in size, preferably 2.2 to 4 times. When it is stretched less than 2 times, the product is likely to become opaque during the following crystallization step and also is likely to have insufficient anti-flexural strength and accordingly, is not preferable. On the other hand, when it is stretched more than 5 times in size, the product is likely to be broken and accordingly, is not preferable.

Stretching is suitably performed at a temperature between the secondary transition temperature of PATE and 140° C., more preferably between the secondary transition temperature of PATE and 130° C. When the temperature is lower than the secondary transition temperature of PATE, it is difficult to carry out stretching, and on the other hand, when it is higher than 140° C., the product is likely to highly crystallize prematurely and to form coarse spherulites. Accordingly, these cases are not preferable.

Stretching can be performed by the conventional methods using rolls or tenters, by inflation, by blow molding or a combination thereof.

(3) Step of preliminary crystallization (step of solvent treating)

One of the remarkable features of the present invention is to preliminarily crystallize the melt-molded products by an organic solvent treatment before thermal treatment and then highly crystallized by thermal treatment, not highly crystallize the molded product directly without preliminary crystallization.

It has been found from the results of electron microscopic observation, that the spherulites of PATE formed by the treatment with an organic solvent are extremely fine. It is assumed that these extremely fine spherulites themselves become the crystallize nucleus in the next step of thermal treatment and contribute to the formation and the development of many fine spherulites.

Although the details of the mechanism of preliminary crystallization of PATE by an organic solvent have not yet been completely clarified, it is assumed that by making PATE contact a liquid or a vapor of an organic solvent, having high affinity to the PATE resin, molecules of the organic solvent diffuse into the inside of molded product of PATE resin. The molecules of the solvent, which have diffused into the inside of PATE resin, would accelerate motions of molecules of the resin and promote crystallization of the polymer by a roll-like function, (so to speak) molecular rolls. Even at the temperature below the secondary transition temperature of the polymer, the function still works and accordingly, it is assumed that the molecular diffusion of the organic solvent into the inside of the molded product controls the rate of crystallization of the polymer.

Accordingly, as means for accelerating the molecular diffusion, there are ways to select an organic solvent having a high affinity to the polymer and to treat it at high temperature increasing momentum of the molecules.

When the temperature of treatment with an organic solvent is higher than its solidifying point at which the molecules of the organic solvent can diffuse, it is theoretically possible to cause crystallization of the polymer. However, a higher temperature of treatment is preferable since it accelerates the crystallization.

However, if the temperature is over 130° C., it is likely that high crystallization will occur forming coarse spherulites in the product and, as a result, the product becomes brittle and opaque and cause dimensional deformation and wavy wrinkles and it is not preferable. The temperature in the range of solidifying point of the solvent to 130° C. is preferable and of 0° to 110° C. is more preferable.

It is desirable that a preliminary crystallization is performed until the increase in the crystallization degree (measured by a density method) reaches not less than 6%, preferably not less than 8%. When the increased portion is less than 6%, it is likely to cause wavy wrinkles on the molded product and to form a certain amount of coarse spherulites and accordingly is not preferable.

The period necessary for performing the preliminary crystallization depends on the thickness of the molded product, kind and concentration of the solvent used and temperature of the treatment, however, it takes a longer time at lower temperature and shorter time at higher temperature. Usually, the range of 1 second to 10 hours, preferably 3 seconds to 5 hours is applied. A period less than one second makes it difficult to control the treatment and on the other hand, the range over 10 hours is not preferable from an economical standpoint.

The step of preliminary crystallization according to the present invention comprises the treatment with the solvent under these conditions. The organic solvent which has a sufficient affinity to PATE can be used effectively for the preliminary crystallization. The organic solvent is brought into contact with the molded product.

Concerning the affinity of the solvent to PATE, generally the SP value, namely the solubility parameter can be an effective measure.

Although SP values to PATE have not yet been identified completely, a solvent having too low an SP value (for instance, aliphatic hydrocarbons) and also having too high an SP value (for instance, water, alcohols, amines, etc.) are not effective. As an organic solvent used in the present invention, those showing an SP value in the range of 8 to 12, more preferably in the range of 8.5 to 11.5 are suitable. Further, details of the SP value, are described in "NIHON GOMU KYOKAI-SHI" (Journal of the Society of Rubber Industry, Japan), Vol. 46, No. 8 (1973).

As the solvent effective in the treatment of the molded product according to the present invention, for instance, carbon disulfide, halogenated hydrocarbons (chloroform, trichloroethylene, perchloroethylene, ethylene dichloride, chlorobenzenes, etc.), ethers (tetrahydrofuran, dioxane, etc.), organic amides (dimethylacetamide, N-methylpyrrolidone, dimethylformamide, tetramethylurea, dimethylimidazolidinone, hexamethyl phosphoric triamide, etc.), thioethers (diphenyl thioether, etc.), aromatic hydrocarbons (toluene, etc.), pyridines or quinolines, ketones (acetone, etc.), esters (ethyl acetate, etc.), nitro compounds (nitrobenzene, etc.) and sulfones (sulforane, etc.), which have respectively an SP value of 8 to 12, can be mentioned. Of these solvents, carbon disulfide, halogenated hydrocarbons, ethers and organic amides are preferable.

These solvents can be used singly or as a mixture. Further, these effective solvents can be used as a mixture with another solvent as a diluent.

In the case of mixing the solvents, it is preferable to mix the diluent in an amount of less than 50 wt. %, because if the mixture contains more than 50 wt. % diluent, it is likely that the crystallization effect of a solvent mixture will be reduced remarkably.

As methods of treating the melt-molded product of PATE resin with the solvent, the method of immersing the molded product in the solvent, the method of coating the solvent on the molded product, the method of exposing the molded product to a vapor of the solvent, can be used. Sometimes, it is preferable to remove the solvent adhered onto the surface of the molded product rapidly, in that case, the solvent can be removed by heat treating the molded product at a temperature of not higher than 130° C. and evaporating the solvent or by washing the molded product with a solvent which can dissolve the adhered solvent and has SP value outside the predetermined range (for example, methanol).

(4) Step of highly crystallizing (step of thermal treatment)

The thermal treatment of the present invention is to remarkably improve thermal-resistance, chemical-resistance and mechanical properties of the molded products by sufficiently crystallizing the product. When the melt-molded product is treated thermally under non-stress conditions without stretching and preliminary crystallization by a solvent, coarse spherulites are formed in the molded product and the product becomes brittle and opaque, dimensional deformation and wavy wrinkles are caused as has been described before.

Because considerable amounts of the extremely fine spherulites are formed in the molded product when the preliminary crystallization by the solvent is performed adequately, even when the treated, molded product is thermally treated under non-stress conditions, and highly crystallized, it is assumed that fine spherulites develop uniformly utilizing the extremely fine spherulites as crystallization nuclei and as a result, a tough and highly crystallized molded product can be obtained without becoming brittle and opaque and without having wavy wrinkles. As a temperature for the thermal treatment, the range of 140° to 300° C. is appropriate, and of 180° to 270° C. is more preferable. When the temperature is below 140° C., as the rate of crystallization is small and the time for the treatment becomes long, the case is uneconomical. On the other hand, when the temperature is over 300° C., it is not preferable since the molded product becomes soft and is likely to cause deformation. In order to make the molded product of PATE resin have excellent properties such as high heat-resistance, chemical-resistance, moisture-resistance, mechanical properties, it is preferable to perform the thermal treatment until the crystallization degree of PATE becomes not lower than 22%, more preferably not lower than 23% and still more preferably not lower than 26%.

The period necessary for the thermal treatment to achieve sufficient crystallization degree depends on the preliminary crystallization degree and thermal treating temperature. However, lower preliminary crystallization degree and lower treating temperature make the necessary time period longer. Usually, the time period in the range of 1 second to 100 hours is preferable and of 3 seconds to 24 hours is more preferable. When the period is shorter than 1 second, it is difficult to control the thermal treatment and when it is longer than 100 hours, thermal degradation of the product is possible. Accordingly, these cases are not preferable.

When a molded product of PATE resin is thermally treated according to the present invention, even when it is performed without substantially applying any stress such as large tension or compression, a product with less wavy wrinkles, high bending strength and high transparency, when no filler is used, can be obtained. These are the big features of the thermal treatment of the present invention and is very suitable to treat a molded product, such as, sheets, plates, pipes, profiles and bottles, which are difficult to treat thermally under stress.

According to the method of the present invention, the dimensional deformation of a molded product in the high crystallization step is extremely small. Consequently, it is usually not necessary to apply any stress such as tension to the molded product during the step to prevent the dimensional deformation.

However, when a molded product is highly stretched (for instance, stretched more than 3.8 times, lengthwise) in the stretching step, it is possible to cause contraction in the high crystallization step. Accordingly, if any dimensional deformation of a molded product is to be strictly avoided, it is desirable to maintain the length in the direction of stretching constant throughout the thermal treatment.

HIGHLY CRYSTALLIZED, MOLDED PRODUCT OF PATE RESIN ACCORDING TO THE PRESENT INVENTION

The molded product according to the present invention is a highly crystallized product having the crystallization degree of PATE in a PATE resin of not less than 22%, preferably not less than 23%. When the crystallization degree is less than 22%, it is possible that the physical properties of the molded product, such as heat-resistance, chemical-resistance and non-inflammability, will be insufficient.

The molded product according to the present invention has a characteristic point that the bending-resistance in the direction perpendicular to the stretching direction is extremely high. When the bending-resistance is expressed using a sheet-form sample of 0.1 mm in thickness as the standard, the bending-resistance number in the direction perpendicular to the stretching direction is more than 1,000. On the other hand, the molded product which was not stretched has a bending-resistance number usually of not more than 100 at the best.

Furthermore, another large characteristic point of the molded product according to the present invention is that its transparency is high when it does not contain any filler.

When its transparency is expressed using a sheet form sample of 0.1 mm in thickness as the standard, the transmissivity to parallel light, $T_p$, is not less than 20%, preferably not less than 30%.

These characteristic points are achieved by stretching the molded product and these are remarkably different from those of the already described invention, for instance, Japanese Patent Application No. 61-296,454, (1986).

One more large, characteristic point of the highly crystallized molded product of PATE resin according to the present invention is that the wavy wrinkles generated during the thermal treatment step (highly crystallizing treatment) is extremely small.

On the other hand, when conventional methods within the thermal treatment is directly performed without preliminary crystallization by a solvent, the wavy wrinkles due to uneven relaxation and contraction of the molded product occurs remarkably and it is likely that the shape of the thermally treated molded product would deviate from the original shape.

The wavy wrinkles on the surface of highly crystallized, molded product of PATE resin according to the present invention are, when measured with a sheet-form shape of 0.1 mm in thickness as the standard, usually not more than about 0.1 mm. On the other hand, the wavy wrinkles on the surface of conventional, molded products, which are directly thermally treated without preliminary crystallization by a solvent, usually becomes even not less than 1 mm.

The molded product, which has extremely small wavy wrinkles, also has extremely small dimensional deformation before and after the thermal treatment. When measured with the sheet-form sample of 0.1 mm in thickness as the standard, the dimensional deformation is usually not more than 10% and particularly, when measured in the direction not stretched, it is usually not more than 7%. On the other hand, in a sample of the conventional method, the dimensional deformation is not less than 30%.

Further, the highly crystallized, molded product of PATE according to the present invention is excellent in heat-resistance, and for example, its heat-resistance to soldering (for 30 seconds at 250° C.) is "excellent".

Still another characteristic point of the highly crystallized, molded product according to the present invention is that the elongation and the strength are large, namely, the product is tough and such a tendency is remarkable at temperatures higher than 100° C. Since the elongation of the product at high temperature is large, it is also a characteristic point that the secondary processings such as compressing and stretching can easily be performed. It is assumed that these points are due to the fact that the spherulites formed are fine. The secondary processing such as compressing and stretching is preferably performed at a temperature of 130° to 270° C. At a temperature below 130° C., it is difficult to perform the secondary processing and on the other hand, at a temperature over 270° C., it is possible to reduce the crystallization degree of a product of the secondary processing. Accordingly, both of these cases are not preferable.

RESIN COMPOSITION

As are described above, the resin prepared by adding various sorts of fillers, which do not react or is not compatible with an organic solvent used, to PATE within a limit not to damage the molding process can be used as a PATE resin in the present invention.

For example, the resin prepared by adding the following one or more materials to PATE can be used in the present invention.

As the inorganic filler: silica, alumina, silica-alumina, mica, kaolin, clay, talc, calcium carbonate, calcium silicate, calcium sulfate, calcium phosphate, carbon black, titanium white, glass, silicon nitride, boron nitride, iron oxide and zirconia, in a powdery form.

As the fibrous filler: fibers of glass, carbon, silica, aramide, etc. and whiskers of potassium titanate, calcium silicate, etc.

As the synthetic resin other than PATE: fluorocarbon resin, silicone resin, polyolefin, polyimide, polyetherimide, polyamide, polyester (including LCP), polyether ether ketone, polyether ketone, polysulfone, polyether sulfone, polyphenylene oxide and polycarbonate.

USAGE

The highly crystallized, molded product of PATE resin obtained according to the present invention can be utilized in various fields while making the most of its special features such as heat-resistance, chemical-resistance, moisture-resistance and non-inflammability.

For example, various molded products such as sheets, plates, pipes, profiles, bottles, filaments, etc. are preferably used.

Plates or sheets are useful in the field of electronics and electricity, for example, as a flexible print-base plate, magnetic tape (coated type, vapor deposited type, etc.), insulating tape and floppy disk.

Crystallized, extrusion-molded products (plates, pipes and profiles) are useful in the field of electronics and electricity, for example, as a rigid print-base plate, protecting tube for composite wiring, etc., and also useful in the field of chemical industry as various corrosion-resistant and heat-resistant pipes.

The electric wire on which the PATE resin is coated and crystallized is useful as a heat-resistant and corrosion-resistant electric wire.

Other crystallized, molded products are useful as a print-base plate, IC-packaging material, connector and parts of microwave instruments in the field of electronics and electricity and as large pumps, large valves, sealing materials and lining materials in the field of chemical industry.

EXPERIMENTAL EXAMPLES

Example of Synthetic Experiment

Into a titanium-lined autoclave, 373 kg of hydrated sodium sulfide (purity: 46.08%) and 1,025 kg of N-methylpyrrolidone (NMP) were introduced and heated to about 203° C. to distill out water. Then, 7 kg of water and 45 kg of NMP were added to the autoclave (total amount of water/NMP=3.0 mol/kg) and the content was reacted for 5 hours at 220° C.

Then, 94 kg of water were added to the autoclave and the reaction was carried out for 30 minutes at 265° C. and further for 6 hours at 245° C. to obtain a slurry containing the formed polymer.

The slurry was sieved through a 0.1 mm mesh screen and only the granular polymer was separated, washed with acetone and then with water to obtain a cleaned polymer. By drying the cleaned polymer at 80° C. under a reduced pressure, the polymer was obtained. The inherent viscosity of the obtained polymer in 1-chloronaphthalene (concentration of the polymer was 0.4 g/dl and at 206° C.) was 0.43 dl/g.

Preparation of Pellets

A part of the obtained polymer was supplied to a single screw extruder by itself, heated to 320° C. to melt and extruded as a string-like material. The extruded material was rapidly cooled in a water bath and cut, and prepared into pellets $P_1$.

EXAMPLE 1

Preparation of Sheets

The obtained pellets $P_1$ of PATE resin were melt-pressed at 320° C. and rapidly cooled to prepare the sheets of 0.1 to 0.7 mm in thickness.

Preparation of Highly Crystallized Product

A strip-type sample sheet (10 mm in width and 100 mm in length) of each T-die sheet was stretched at 98° to 100° C. under the predetermined times in length to prepare a sheet of 0.1 mm in thickness (the code number of the stretched sheets being $E_1$ to $E_8$) with (1) a TENSILON (made by TOYO-BALDWIN Co., Ltd.) in case of monoaxial stretching and (2) a small biaxial stretching machine (made by T. M. LONG, Ltd.) in case of biaxial stretching.

Each stretched sheet was immersed into respective various solvent under various temperatures and times for immersion, and performing the preliminary crystallization.

After the immersion, the treated sheet was thrown into methanol to wash out the adhered solvent and dried for a night at room temperature under a reduced pressure to obtain a sample of the preliminarily crystallized, molded product (the code number of the preliminarily crystallized, molded products being $PC_1$ to $PC_8$).

The obtained preliminarily crystallized, molded product was thermally treated in a free state in an oven of a high temperature for a predetermined time period to obtain the highly crystallized, molded product (the code number of the highly crystallized, molded product being HC$_1$ to HC$_8$).

The crystallization degree was measured on each sample of the molded product (stretched, molded products; preliminarily crystallized, molded products and highly crystallized, molded products). The method for measuring the crystallization degree is as follows:

The density of the sample is measured at 20° C. with a density gradient tube containing an aqueous solution of lithium bromide, and from the value obtained, the crystallization degree of the sample is calculated, however, the calculation is carried out based on the density value of the crystallized part of PATE, 1.43 g/cc, and the density value of the amorphous part of PATE, 1.32 g/cc. The results of measurement are shown in Table 1.

Separately, the sample sheet of the highly crystallized, molded product was spread out and placed between two glass plates and the gap between the plates was measured. Meanwhile, the thickness of the sample sheet was measured with a dialgauge and from the difference between values of the gap and the thickness, the wavy wrinkles of the sample sheet was determined.

Further, the dimensional deformation of the sample sheet before and after the thermal treatment was studied by measuring lengthwise and widthwise dimensions of the molded product with a slide caliper. The results are shown also in Table 1. Still more, the highly crystallized, molded product already having remarkable wavy wrinkles was not further studied, because it is meaningless to evaluate other physicaly properties further.

Still more, on the highly crystallized, molded products, the heat-resistance to soldering was studied to evaluate its heat-resistance. Namely, the sample was immersed for 30 seconds into a solder bath at 250° C. and presence or absence of occurrence of deformation was observed. The sample which showed any deformation was evaluated as "poor" and the sample which did not show any deformation was evaluated as "excellent".

The bending-resistance test was carried out by repeated bending of the sample of 0.1 mm in thickness ±135° under a load of 1 kg with a bending-resistance tester of MIT type. The number of times of bending until the sample was broken was measured and expressed as the bending-resistance number.

The transmissivity to parallel light of the sample was measured according to Japanese Industrial Standards (JIS)K-6714 on the sample of 0.1 mm in thickness by a hazemeter (made by TOKYO-DENSHOKU Co., Ltd., Model TC-3).

The results of these tests are collectively shown in Table 2.

The SP value of the organic solvents to PATE used in the solvent treatment are as follows:

| chloroform: | 9.2 |
| carbon disulfide: | 10.0 |
| tetrahydrofuran: | 9.5 and |
| toluene: | 8.9. |

Although the SP value of NMP is unknown, it is presumed to be about 10. The SP value of the solvent used as a diluent is as follows:

| ethanol: | 12.9. |

Obviously, numerous modifications and variations of the present invention are possible in light of the above teachings. It is therefore to be understood that within the scope of the appended claims, the invention may be practiced otherwise than as specifically described herein.

TABLE 1

| | Stretching | | | | | Preliminary Crystallization | | | |
| No. | Temp (°C.) | Stretching (times) L (*1) | W (*2) | Crystallization Degree (%) | Code No. | Solvent | Temp (°C.) | Time Period (Sec) | Crystallization Degree (%) | Code No. |
| --- | --- | --- | --- | --- | --- | --- | --- | --- | --- | --- |
| 1 | 98–100 | 3.5 | — | 4 | E1 | A (*8) | 60 | 600 | 21 | PC1 |
| 2 | 98–100 | 2.8 | — | 4 | E2 | A | 60 | 600 | 20 | PC2 |
| 3 | 98–100 | 2.5 | 2.5 | 5 | E3 | A | 60 | 600 | 21 | PC3 |
| 4 | 98–100 | 3.5 | — | 4 | E4 | B (*9) | 25 | 1200 | 20 | PC4 |
| 5 | 98–100 | 3.5 | — | 4 | E5 | C (*10) | 25 | 600 | 21 | PC5 |
| 6 | 98–100 | 3.5 | — | 4 | E6 | — | — | — | — | — |
| 7 | — | — | — | 2 | E7 | A | 60 | 600 | 19 | PC7 |
| 8 | 98–100 | 1.5 | — | 2 | E8 | A | 60 | 600 | 20 | PC8 |
| 9 | 98–100 | 5 | — | — | — | — | — | — | — | — |

| | | | Highly Crystallization | | Dimentional (*7) deformation | | | |
| No. | Temp (°C.) | Time Period (min) | Crystallization Degree (%) | Wavy Wrinkle (mm) | L (*1) | W (*2) | Code No. | Remarks |
| --- | --- | --- | --- | --- | --- | --- | --- | --- |
| 1 | 260 | 10 | 30 | <0.03 | 99 | 96 | HC1 | |
| 2 | 260 | 10 | 29 | <0.03 | 100 | 96 | HC2 | |
| 3 | 260 | 10 | 31 | <0.03 | 100 | 101 | HC3 | |
| 4 | 260 | 10 | 28 | <0.03 | 100 | 94 | HC4 | |
| 5 | 260 | 10 | 29 | <0.03 | 100 | 95 | HC5 | |
| 6 | 260 | 10 | 28 | 1.5 | 85 | 43 | HC6 | (*3) |
| 7 | 260 | 10 | 29 | <0.03 | 101 | 100 | HC7 | (*4) |
| 8 | 260 | 10 | 28 | <0.03 | 99 | 96 | HC8 | (*5) |

TABLE 1-continued

| 9 | — | — | — | — | — | — | — | (*6) |

(*1) Lengthwise direction, (%)
(*2) Widthwise direction, (%)
(*3) Not treated with solvent (Comparative Example),
(*4) No stretching (Comparative Example),
(*5) Insufficient stretching (Comparative Example),
(*6) Broken when stretched
(*7) FIG. 100 means there is no dimensional deformation
(*8) Solvent A: Chloroform/NMP = 90/10 (wt/wt);
(*9) Solvent B: THF/EtOH = 90/10 (wt/wt);
(*10) Solvent C:CS$_2$/Toluene = 50/50 (wt/wt).

TABLE 2

Properties of the Highly Crystallized Product

| Code Number | Transmissivity to parellel light (%) | Bending-Resistance Test (Number of Times) | Heat-Resistance to Soldering | Remarks |
| --- | --- | --- | --- | --- |
| HC1 | 65 | >5,000 | Excellent | |
| HC2 | 71 | >5,000 | Excellent | |
| HC3 | 60 | >5,000 | Excellent | |
| HC4 | 66 | >5,000 | Excellent | |
| HC5 | 58 | >5,000 | Excellent | |
| HC7 | 4 | 40 | Excellent | Not Stretched, Comp. Ex. |
| HC8 | 12 | 90 | Excellent | Insufficient Stretching. Comp. Ex. |

What is claimed as new and desired to be secured by Letters Patent of the United States is:

1. A highly crystallized, molded product of polyarylene thioether obtained by the process comprising the steps of
(1) stretching a molded product, consisting of a resin having polyarylene thioether, containing not less than 70 mol % of the repeating unit of

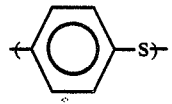

as the main component and having the crystallization degree (measured by a density method) of polyarylene thioether in said resin of not more than 15%, in at least one direction at a stretching ratio of 2 to 5 times;

(2) making at least one organic solvent, having a solubility parameter, SP value, in the range of 8 to 12, or a mixed solvent, containing not less than 50% by weight of said organic solvent, and contacting said solvent with the stretched, molded product at a temperature in the range of from the solidifying point of said organic solvent or said mixed solvent to 130° C., thereby preliminarily crystallizing the treated, molded product until the increased portion of the crystallization degree of polyarylene thioether in said stretched product becomes not less than 6%; and then (3) subjecting the preliminarily crystallized, molded product to thermal treatment at a temperature in the range of 140° to 300° C. until the crystallization degree of polyarylene thioether in said molded product reaches not less than 22%.

2. A highly crystallized, molded product of polyarylene thioether according to claim 1, wherein a thickness thereof is in the range of 0.01 to 5 mm.

3. A highly crystallized, molded product of polyarylene thioether according to claim 1, wherein a percentage of dimensional deformation by said thermal treatment is not more than 10% and the bending resistance number (bending in the direction perpendicular to the stretching direction) is not less than 1,000 when both figures are measured with a sample sheet of 0.1 mm in thickness.

4. A highly crystallized, molded product of polyarylene thioether according to claim 1, wherein its transmissivity to parallel light, Tp, is not less than 20% when it is measured with a sample sheet of 0.1 mm in thickness and substantially not containing any filler.

5. A highly crystallized, molded product of polyarylene thioether according to claim 1, wherein said thermal treatment is performed with no stress.

* * * * *